March 17, 1970     H. SPRANGER ET AL     3,501,618
ELECTRIC ARC PROCESS FOR PRODUCING APERTURES
IN PLASTIC ELEMENTS
Filed Jan. 25, 1968
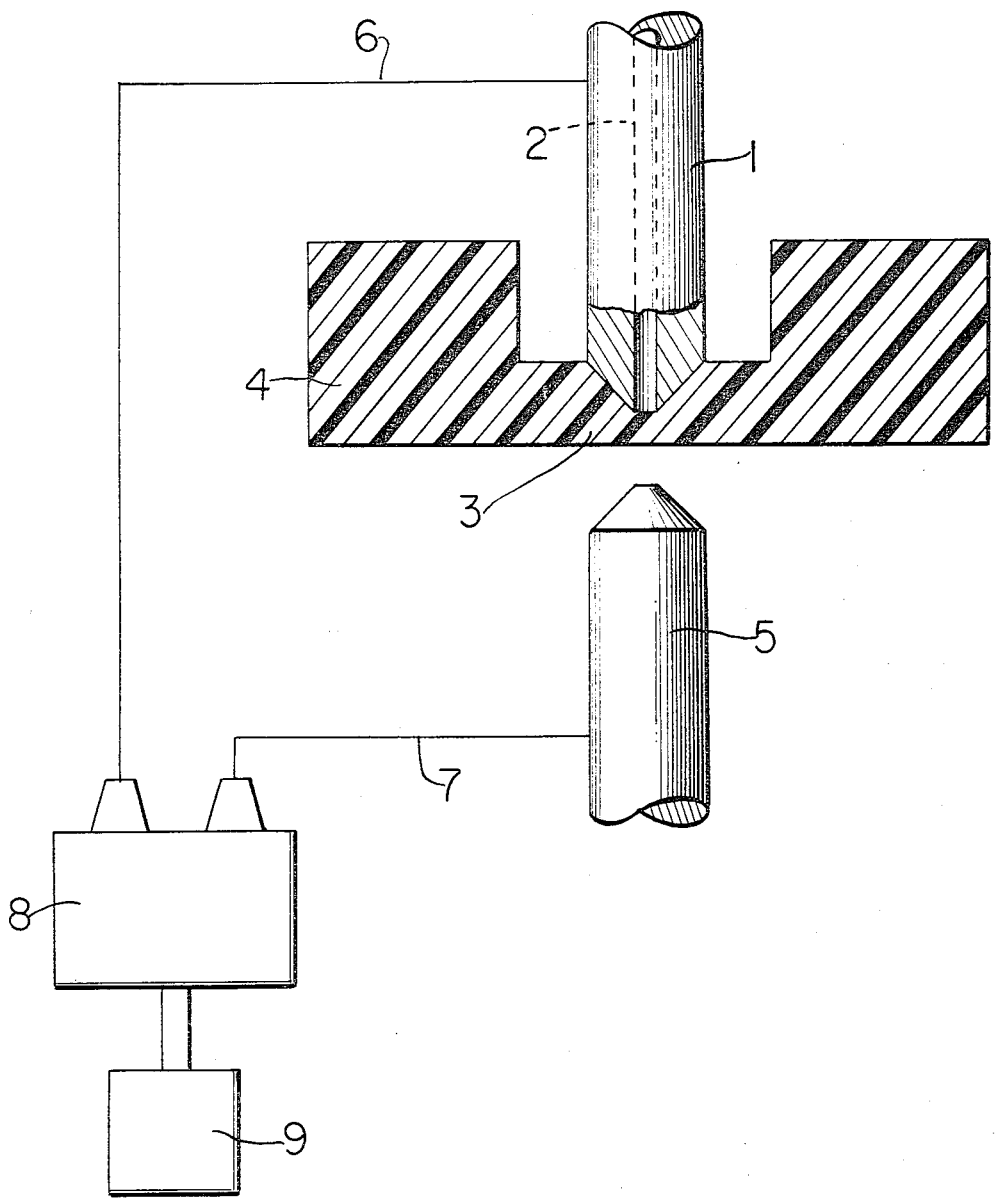
INVENTORS
HELMUT STRANGER
HANS-JOACHIM EISENTRAUT
ALEXANDER FRENZEL
BY ERHARD SCHREIBER
ATTORNEYS

United States Patent Office 3,501,618
Patented Mar. 17, 1970

3,501,618
ELECTRIC ARC PROCESS FOR PRODUCING APERTURES IN PLASTIC ELEMENTS
Helmut Spranger, Oederan, Hans-Joachim Eisentraut, Dresden, Alexander Frenzel, Breitenau, and Erhard Schreiber, Freital, Germany, assignors to "Polyplaste" H. Rolf Spranger KG., a corporation of Germany
Filed Jan. 25, 1968, Ser. No. 700,624
Int. Cl. H05b 7/18
U.S. Cl. 219—384      4 Claims

ABSTRACT OF THE DISCLOSURE

A novel process for forming small, unobstructed apertures in plastic elements such as small plastic nozzles and for cutting plastic elements by an electric arc. Facilitating and controlling the electric arc by providing the spark gap with a hot gas stream.

PRIOR ART

The preparation of injection- or pressure-molded elements made of plastic frequently meets difficulties when the plastic elements are to be provided with small diameter apertures. During injection and pressure molding processes, the position of the die is shifted a small percent of a millimeter by the injection or molding pressure which forms a small interstice between the die and billet and the molten plastic material penetrates this interstice during the molding process and fills it entirely or partially, whereby the apertures in the finished plastic elements are either completely or partially clogged with an interfering plastic residue. Up to now, the said plastic residue has been removed from the apertures by drilling, grinding or cutting out of the plastic residue. However, the plastic residue in cutting or drilling operations is frequently merely pushed aside temporarily and returns to its original position after a short time due to the flexibility of the plastic. In removing the plastic residue by grinding, the small apertures frequently are clogged by the grinding dust produced and the grinding tools are subjected to considerable wear. In other words, the known processes do not produce satisfactory plastic nozzles with small apertures and are time-consuming and expensive due to the need of employing finishing steps on the apertures.

OBJECTS OF THE INVENTION

It is an object of the invention to provide a novel process for producing plastic elements with small apertures.

It is another object of the invention to provide an economical method of forming small apertures in plastic elements in a single working step without finishing steps and auxiliary working means.

These and other objects and advantages of the invention will become obvious from the following detailed description.

THE INVENTION

The process of the invention for producing apertures in plastic elements comprises pressing at least one electrode of a high-voltage arc means into the plastic element and passing a high voltage alternating current through the electrodes while passing a stream of gas in the spark gap between the electrodes whereby an aperture is formed in the plastic after the time of two consecutive half-waves of the said current.

The gas stream which is preferably a hot gas stream is introduced into the spark gap by having at least one electrode developed as a nozzle to pass the hot gas. The gas stream in the spark gap aids in facilitating and controlling the arc.

The electrodes are preferably heated and pressed into the plastic element in order to reduce the spark gap and therefore reduce the voltage required for the arc. Heating the electrodes makes it easier for the electrode to penetrate the plastic element.

The electrodes of the high voltage arc are preferably made of a tungsten-silver-nickel alloy since these electrodes are easily heated and shown an insignificant wear or consumption during the process. Preferably, the electrode to be pressed into the plastic element is developed as a nozzle for the hot gas although both electrodes forming the arc may be developed as nozzles and/or may be heated and pressed into the plastic element to further reduce the spark gap.

The spark of the arc of the process of the invention produces a perfect aperture free of any obstruction of substantially round shape and the process is particularly useful for forming spray heads for nozzles. Moreover, the process produces the apertures without mechanical tools or any expensive accessories in a single working step and has the advantage of being easily automated.

Referring now to the drawing.

Sole figure illustrates in cross-section one embodiment of an apparatus for performing the process of the invention.

In the figure the heated upper electrode 1 which is provided with a bore 2 for the heated gas stream penetrates with its tip halfway into the aperture wall 3 of the plastic element 4 and counter electrode 5 is placed below wall 3 in axial relationship with electrode 1. The electrodes 1 and 5 are connected to high voltage generator 8 by high voltage leads 6 and 7. The arc voltage and duration of voltage are controlled by mechanism 9. As pointed out above, the lower electrode 5 may also be provided with a bore for hot gas and/or may be heated and if desired may also penetrate the plastic element to reduce the spark gap.

Various other modifications of the process of the invention may be made without departing from the spirit or scope thereof and it is to be understood that the invention is to be limited only as defined in the appended claims.

We claim:

1. A process for cutting plastic elements which comprises positioning a plastic element between the metal electrodes of a high voltage, alternating current arc means whereby at least one of the electrodes is heated and is pressed into the plastic element to be cut and passing an arc through said plastic element and simultaneously passing a stream of gas through the electrode penetrating the plastic element and into the spark gap between the electrodes.

2. The process of claim 1 wherein the duration of the current is two consecutive half waves of the alternating current.

3. The process of claim 1 wherein the gas in the spark gap is heated.

4. The process of claim 1 wherein the electrodes are made of a tungsten-silver-nickel alloy.

References Cited

UNITED STATES PATENTS

| | | | |
|---|---|---|---|
| 2,763,759 | 9/1956 | Mito et al. | 219—384 |
| 3,017,486 | 1/1962 | Kogan et al. | 219—383 |
| 3,164,716 | 1/1965 | Schenker et al. | 219—383 |
| 3,265,860 | 8/1966 | Klossika | 219—384 |
| 3,351,740 | 11/1967 | Heuer | 219—384 |

VOLODYMYR Y. MAYEWSKY, Primary Examiner

U.S. Cl. X.R.

83—16; 204—323